(12) United States Patent
Nagata

(10) Patent No.: US 10,350,767 B2
(45) Date of Patent: Jul. 16, 2019

(54) SENSOR, DRIVING MECHANISM, AND ROBOT

(71) Applicant: CANON KABUSHIKI KAISHA, Tokyo (JP)

(72) Inventor: Toru Nagata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/353,580

(22) Filed: Nov. 16, 2016

(65) Prior Publication Data

US 2017/0136629 A1 May 18, 2017

(30) Foreign Application Priority Data

Nov. 18, 2015 (JP) .................. 2015-225421
Oct. 28, 2016 (JP) .................. 2016-211606

(51) Int. Cl.
| | |
|---|---|
| *G01L 3/12* | (2006.01) |
| *B25J 13/08* | (2006.01) |
| *B25J 9/16* | (2006.01) |
| *G01L 5/00* | (2006.01) |

(52) U.S. Cl.
CPC .......... *B25J 13/085* (2013.01); *B25J 9/1633* (2013.01); *G01L 3/12* (2013.01); *G01L 5/0061* (2013.01); *G05B 2219/39529* (2013.01)

(58) Field of Classification Search
CPC .......... B25J 13/085; B25J 9/1633; G01L 3/12

USPC .................................................. 73/862.471
See application file for complete search history.

(56) References Cited

FOREIGN PATENT DOCUMENTS

| | | |
|---|---|---|
| JP | S60-177233 A | 9/1985 |
| JP | S63-029224 A | 2/1988 |
| JP | 10-286789 A | 10/1998 |
| JP | 2010-281635 A | 12/2010 |
| JP | 2012-189516 A | 10/2012 |
| JP | 2015-180909 A | 10/2015 |

*Primary Examiner* — Jamel E Williams
(74) *Attorney, Agent, or Firm* — Canon U.S.A., Inc. IP Division

(57) ABSTRACT

An elastic member of a torque sensor includes spring portions, a first fastening portion, and a second fastening portion. The spring portions are disposed in a radial pattern between the first and second fastening portions to connect the first and second fastening portions together. The spring portions have a dimension smaller in a direction tangential to a circle centered on an rotation axis than in a direction of the radial pattern. The distance between the first fastening portion and the second fastening portion is smaller than the dimension in the direction of the radial pattern. The optical encoders are opposed on, for example, the same diameter on a circumference of a concentric circle centered on a rotation axis of the rotational displacement of the elastic member. For example, averaging output signals from a plurality of optical encoders reduces influence of disturbance, such as cross-axis force.

21 Claims, 11 Drawing Sheets

SENSOR, DRIVING MECHANISM, AND ROBOT

BACKGROUND

Technical Field

The present disclosure relates to a sensor that detects force acting around a rotation axis, a driving mechanism that uses the sensor, and a robot.

Description of the Related Art

In recent years, articulated robots have been used in various industrial product assembly lines. However, there are also many processes that are difficult to perform with articulated robots. For example, articulated robots are widely used particularly in processes in which loads from several hundred grams to several kilograms are applied in automotive-component assembly lines. In contrast, for processes in which loads on components need to be on the order of grams, for example, assembly of workpieces made of a soft material, a lightweight material, or a low-strength material, and processes of close tolerance fitting, there are various difficulties in performing with articulated robots.

Such workpieces made of a soft, lightweight, or low-strength material should not be subjected to large force to prevent damage and deformation of the workpieces. In operating this type of workpiece with an articulated robot, force that acts on the workpiece via joints and links needs to be accurately controlled.

In particular, of forces that act on the links of a robot arm, a force that needs to be measured to accurately control driving of the articulated robot is torque acting around the drive axes of the joints.

Close tolerance fitting of workpieces made of a soft, lightweight, or low-strength material using an articulated robot needs high-accuracy, high-resolution sensors at the joints of the arms.

For a configuration in which the amount of deformation of an elastic member that transmits a driving force is detected using a detection head, the amount of deformation relative to the force needs to be increased to enhance the resolution of the torque sensor. However, increasing the amount of deformation of the elastic member relative to the same force can decrease the rigidity of the torque sensor in a torque detecting direction. The decrease in the rigidity of the torque sensor will decrease the rigidity of the joint mechanism and the driving control range of the articulated robot, which can decrease the controllability. The decrease in the rigidity of the joint mechanism is reduced as much as possible also with a high-resolution torque sensor that detects force acting on a joint.

Japanese Patent Laid-Open Nos. 10-286789 and 2012-189516 disclose configurations including guide members to ensure high rigidity of the joint mechanisms or in consideration of cross-axis force acting on the joints (force acting in five directions except about the driving axes of the joints). For example, in Japanese Patent Laid-Open No. 10-286789, a bearing is provided as a guide member for supporting cross-axis force at a relative displacement portion of two links connected with a joint. A torque sensor disclosed in Japanese Patent Laid-Open No. 2012-189516 has a configuration in which a guide member that prevents an elastic member from being deformed in a cross-axis direction is provided on the elastic member.

However, a guide member, such as a bearing, for ensuring sufficient rigidity of the joint, or supporting cross-axis force will act as a load on driving around the driving axis of the joint. For example, retaining and restricting the torque sensor with the guide member will influence the torque around the joint driving axis, which may hinder accurate detection of the torque around the joint driving axis to be detected by the torque sensor.

For that reason, to accurately detect the torque around the joint driving axis with the torque sensor, it is necessary to support the cross-axis force with the elastic member of the torque sensor without using the guide member. In other words, to enhance the torque detection accuracy, no guide member is used, and a decrease in rigidity in the cross-axis direction needs to be prevented.

SUMMARY

The present disclosure provides a torque sensor capable of high-accuracy, high-resolution torque detection in handling a soft, lightweight, or low-strength member with a robot apparatus. The present disclosure provides a torque sensor having high rigidity and capable of high-resolution torque detection both in a torque detecting direction and cross-axis directions.

A sensor according to an aspect of the present disclosure includes a first fastening portion and a second fastening portion, a plurality of spring portions, and at least one optical encoder. The first fastening portion and the second fastening portion are operatively to be individually fastened to relatively moving objects to be measured. The spring portions are disposed in a radial pattern about a rotation axis around which the first fastening portion and the second fastening portion are rotationally displaced. The spring portions connect the first fastening portion and the second fastening portion together. The at least one optical encoder includes a scale unit and an optical detection unit opposed to the first fastening portion or the second fastening portion.

A driving mechanism according to another aspect of the present disclosure is for driving a first link and a second link relative to each other. The mechanism includes a driving unit and a sensor. The driving unit includes a fixed portion and a driven portion and drives the driven portion with respect to the fixed portion. One of the fixed portion and the driven portion is fixed to the first link. The sensor connects the other of the fixed portion and the driven portion to the second link. The sensor is configured to detect force acting on the other of the fixed portion and the driven portion and the second link. The sensor includes a first fastening portion fastened to the first link, a second fastening portion fastened to the second link, a plurality of spring portions, and an optical encoder. The spring portions are disposed in a radial pattern about a rotation axis around which the first fastening portion and the second fastening portion are rotationally displaced. The spring portions connect the first fastening portion and the second fastening portion together. The optical encoder includes a scale unit and an optical detection unit opposed to the first fastening portion or the second fastening portion.

According to aspects of the present disclosure, an optical encoder capable of high-resolution position detection is used as a detecting device of a torque sensor. This allows detection of minute displacement of the elastic member of the torque sensor and reduces the amount of deformation of the elastic member while satisfying torque detection resolution necessary for the torque sensor. This allows the rigidity of the torque sensor in the torque detecting direction to be enhanced, thus achieving both of high resolution and high rigidity.

Further features of the present invention will become apparent from the following description of exemplary embodiments with reference to the attached drawings.

DESCRIPTION OF THE EMBODIMENTS

Embodiments of the present disclosure will be described hereinbelow with reference to the accompanying drawings. It is to be understood that the embodiments described below are mere examples and that the details of the configuration can be modified as appropriate by those skilled in the art without departing from the spirit of the present disclosure. The numeral values in the embodiments are given for reference sake and are not intended to limit the present disclosure.

First Embodiment

Schematic Configuration of Robot Apparatus

Figure 1:
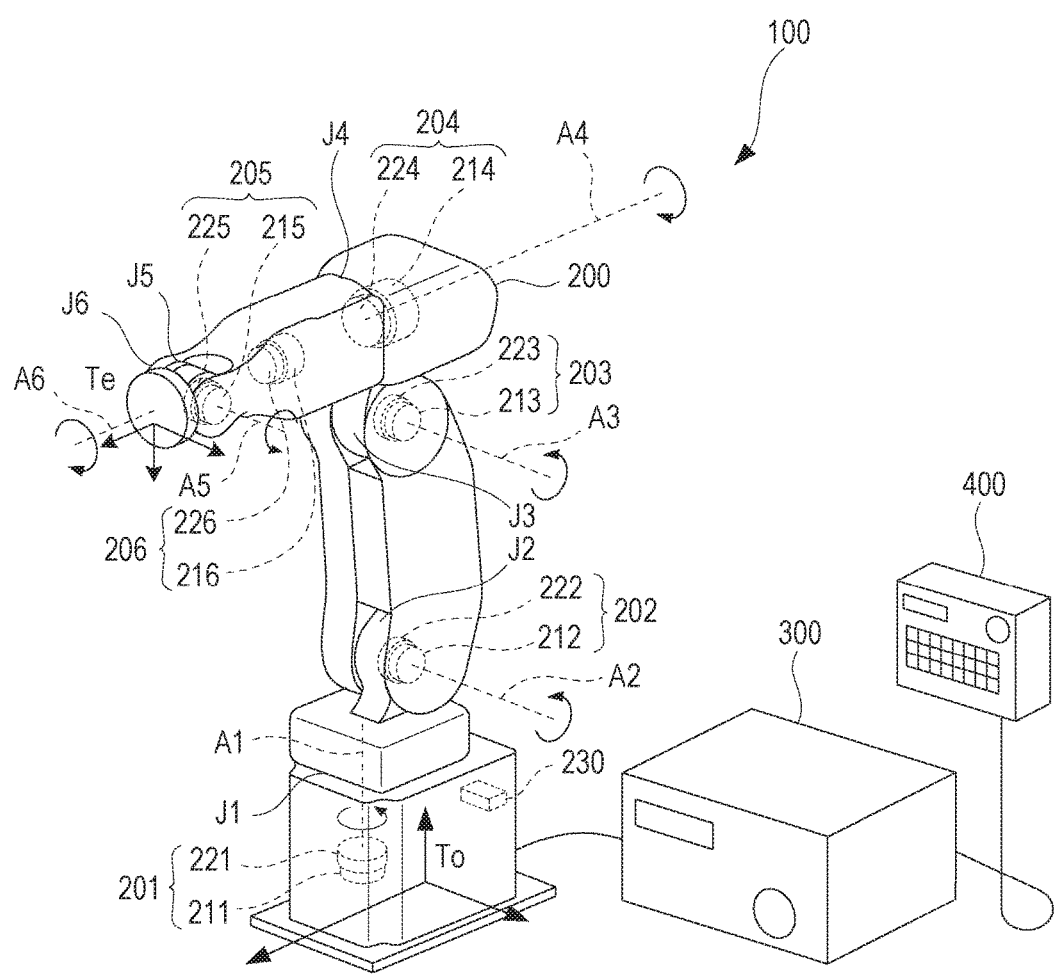
FIG. 1 is a diagram illustrating, in outline, the configuration of a robot apparatus according to the first embodiment.

The schematic configuration of a robot apparatus according to a first embodiment will be described. FIG. 1 illustrates, in outline, the configuration of the robot apparatus according to the first embodiment. In FIG. 1, the robot apparatus 100 includes a robot arm 200 configured as an articulated robot, a robot control unit 300 that controls the robot arm 200, and a teaching pendant 400.

The teaching pendant 400 is a teaching unit that transmits data on a plurality of teaching points to the robot control unit 300 and is used mainly for an operator to designate the robot operation of the robot arm 200 in the site where the robot apparatus 100 is installed.

The robot arm 200 of this embodiment is configured as a six-axis articulated arm. The robot arm 200 include a plurality of (six) servo motors 201 to 206 that rotationally drive joints J1 to J6 about joint axes A1 to A6, respectively. In other words, the servo motors 201 to 206 serve as driving sources that generate driving force for relatively displacing a first link and a second link to which the joints J1 to J6 connect. Although this embodiment shows servo motors as an example, any other driving mechanism including a fixed portion and a driven portion that is driven relative to the fixed portion can be employed.

Controlling the rotation angles of the joints J1 to J6 with the robot control unit 300 enables the end of the robot arm 200 to be pointed to any three orientations at any three-dimensional positions within a movable range.

In general, the position and orientation of the robot arm 200 are expressed in three-dimensional (XYZ) rectangular coordinate system. For example, sign To in FIG. 1 indicates a coordinate system fixed to the base of the robot arm 200, and sign Te indicates a coordinate system fixed to the end of the robot arm 200.

Figure 2:
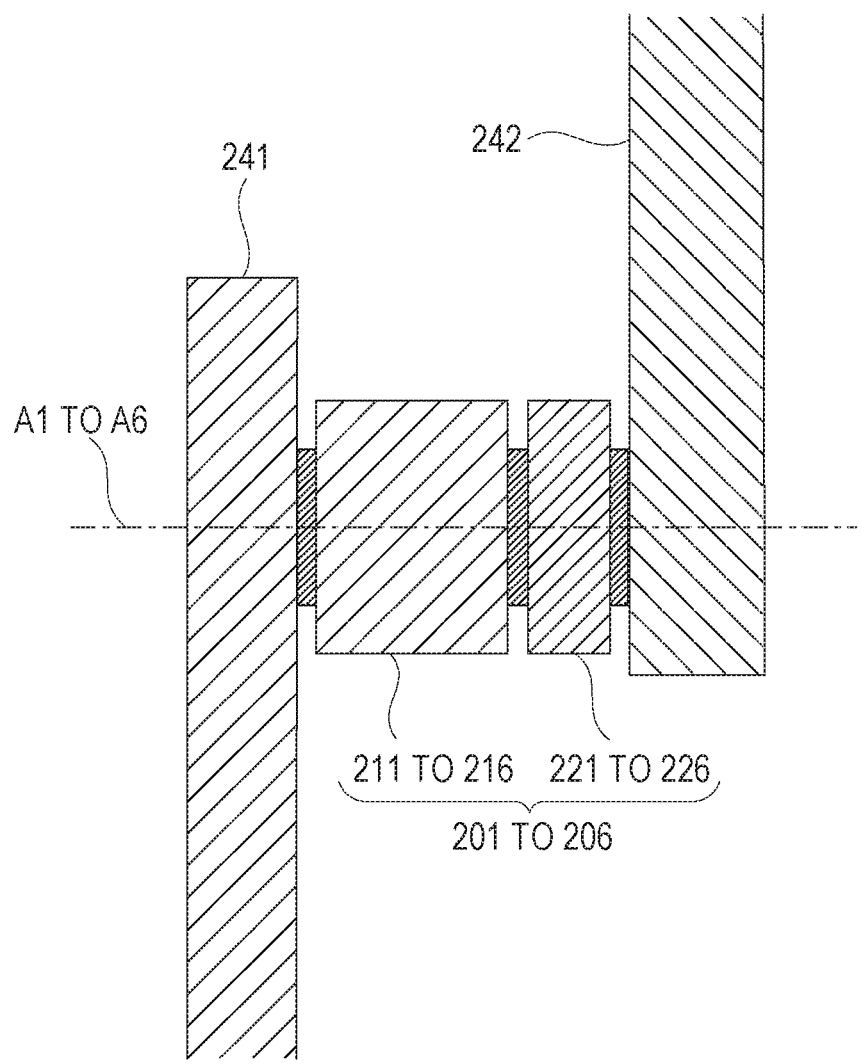
FIG. 2 is a cross-sectional view of joints of the robot apparatus in FIG. 1 illustrating the configuration thereof.

As shown in FIG. 2, the joints J1 to J6 of the robot arm 200 each connect a frame 242 of the second link at a moving side (a driven side) to a frame 241 of the first link at a fixed side (a supporting side) so as to allow relative rotation. The angles of the relative rotation of the joints J1 to J6 are respectively controlled by the servo motors 201 to 206. The servo motors 201 to 206 respectively serve as driving sources for the joints J1 to J6 and include electric motors 211 to 216 and torque sensors 221 to 226 for detecting the torque of the joints J1 to J6.

The left base portions of the servo motors 201 to 206 are each fixed to the frame 241 of the fixed (supporting)-side first link. The torque sensors 221 to 226 with a configuration described below are disposed between the respective output drive shaft of the servo motors 201 to 206 and the frame 242 of the moving (driven) side second link. Each of the torque sensors 221 to 226 includes an elastic member and an optical encoder that detects the amount of deformation of the elastic member, as described below. When the joint (J1 to J6) is driven, the amount of deformation of the elastic member of the torque sensor (221 to 226) caused by the relative displacement of the frame 242 of the second link and the drive axis of the servo motor (201 to 206) is detected by the optical encoder.

Each of the servo motors 201 to 206 may further include a reduction gear using a strain wave gearing mechanism (not shown for the sake of simplicity).

One end of the electric motor (211 to 216) is fixed to one end of the torque sensor (221 to 226). The other end of the electric motor (211 to 216) is fixed to the fixing side frame 241, and the other end of the torque sensor (221 to 226) is fixed to the moving-side frame 242.

Figure 11:
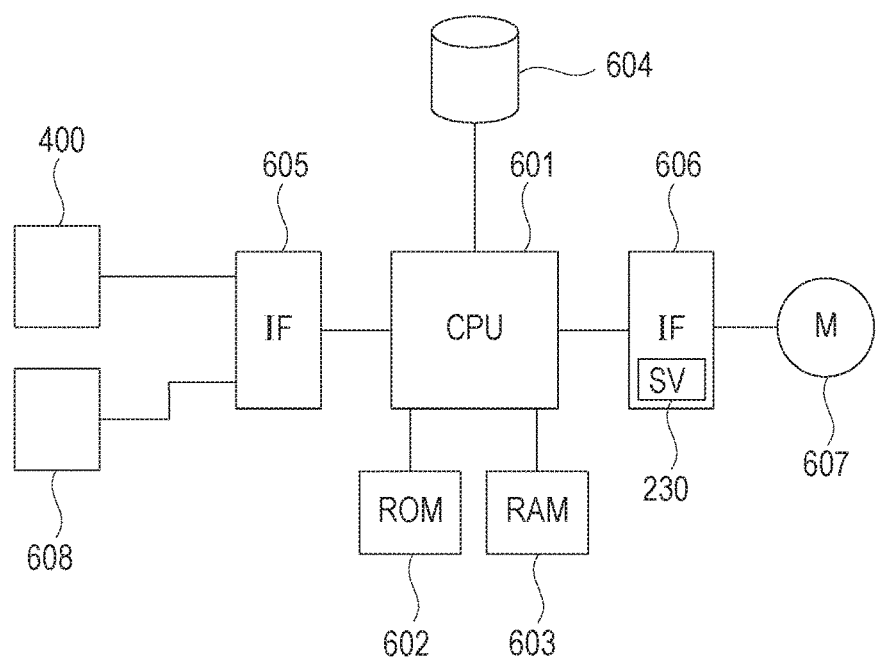
FIG. 11 is a block diagram illustrating the configuration of a robot control unit.

FIG. 11 illustrates an example of the hardware configuration of the robot control unit 300. As shown in FIG. 11, the robot control unit 300 includes a central processing unit (CPU, a calculation unit) 601, a read-only memory (ROM) 602, a random-access memory (RAM) 603, a hard disk drive (HDD, a storage unit) 604, and interfaces 605 and 606.

The ROM 602 is used to store control programs that the CPU 601 implements and constant data. The RAM 603 is used as a work area when the CPU 601 implements a robot control program (described below). The HDD 604 is used as a storage unit that stores various data, for example, the results of calculation performed by the CPU 601. The robot control program can be stored in the ROM 602 or the HDD 604 in a file format.

The control program storage area of the ROM 602 may be constituted by a rewritable memory device, such as an electrically erasable programmable ROM (EEPROM). The robot control program can be installed in the control program storage area of the ROM 602 or the HDD 604 via a computer-readable storage medium, such as flash memories or optical disks based on various standards (not shown). Alternatively, the details of the program stored in the ROM 602 or the HDD 604 can be updated.

A network interface (not shown) may be provided in the robot control unit 300. In this case, the robot control program may be installed in the ROM 602 or the HDD 604, or stored details may be updated via the network interface over a network.

A servo control unit 230 is disposed between the robot control unit 300 and the robot arm 200 as a driver interface that controls driving of the electric motors 211 to 216 of the servo motors 201 to 206. Although FIG. 11 illustrates the servo control unit 230 as a subblock in the interface 606, the servo control unit 230 may be disposed at any position in terms of hardware. The respective electric motors 211 to 216 of the respective servo motors 201 to 206 in FIG. 11 are simply illustrated as a single block (607).

The servo control unit 230 outputs current commands to the electric motors 211 to 216 on the basis of, for example, torque command values that the CPU 601 inputs so that the torque of the joints J1 to J6 follow the command torque values. Thus, the operation of the electric motors 211 to 216 is controlled. The servo control unit 230 may be a single controller having control channels through which the electric motors 211 to 216 can be independently controlled or independent servo controllers for the individual electric motors 211 to 216.

Referring to FIG. 11, the teaching pendant 400 described above is connected to the interface 605, so that the CPU 601 acquires operation data from the teaching pendant 400 via the interface 605. The CPU 601 can acquire the outputs of the torque sensors 221 to 226 disposed for the joints J1 to J3 via the interface 605. FIG. 11 illustrates the torque sensors 221 to 226 for the joints J1 to J6 as a single block 608.

Controlling the motions of the joints J1 to J6 of the robot arm 200 with the robot control unit 300 allows the robot arm 200 to perform predetermined operation, such as assembly of industrial products. The motion of the robot arm 200 controlled by the robot control unit 300 is described in the form of a list of teaching points corresponding to the positions and orientations of a reference portion, such as the end of the robot arm 200. Such a teaching point list is created by designating data on a teaching point at a predetermined point to the robot control unit 300 while actually changing the orientation of the robot arm 200 with the teaching pendant 400.

Figure 12:
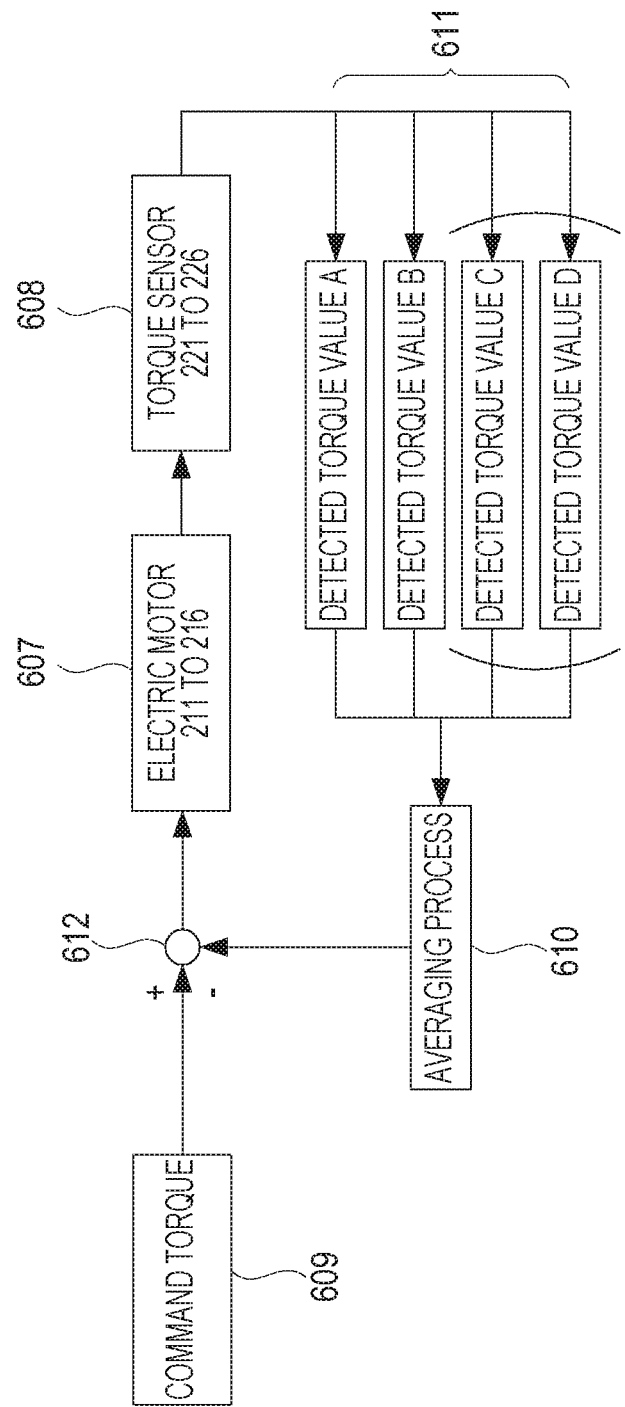
FIG. 12 is a block diagram illustrating the control function of the robot control unit.

FIG. 12 illustrates a control function, in block representation, implemented by executing the control program with the robot control unit 300 (in particular, the CPU 601). In FIG. 12, a command torque 609 is the command value of torque to be generated in the robot arm 200, for example. The command torque 609 is generated according to the robot control program that describes a teaching point designated by an operation command from the teaching pendant 400 and the details of work to be executed by the robot arm 200.

In FIG. 12, the command torque 609 is input to an adding-side input end of a feedback control unit 612, illustrated in the form of an adder-subtracter, and torque control values are output from the output end of the feedback control unit 612 to the electric motor 607 (211 to 216) of the joints J1 to J6.

Figure 8:
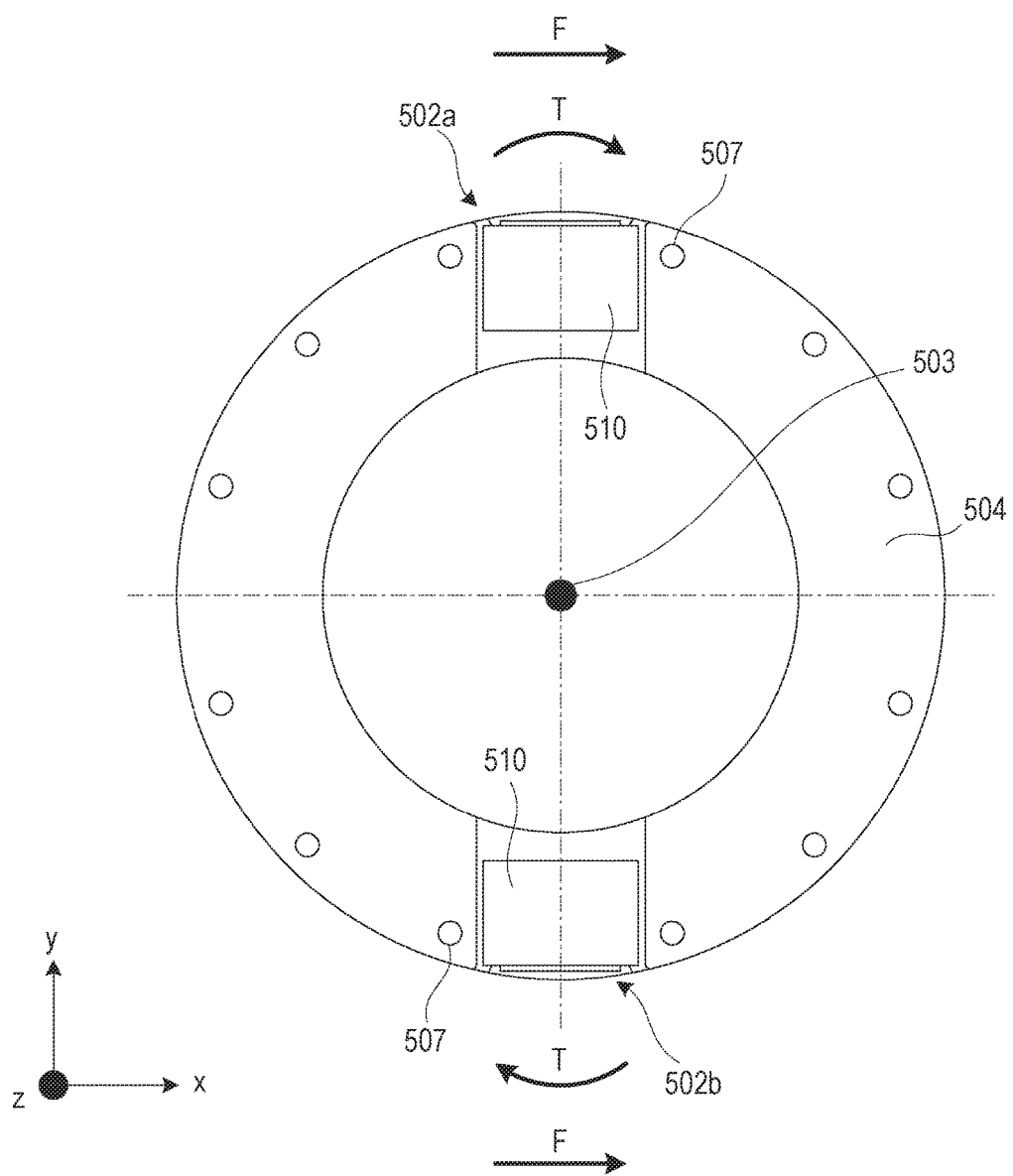
FIG. 8 is a diagram illustrating a layout of torque sensors and cross-axis force in the robot apparatus in FIG. 1.
Figure 9:
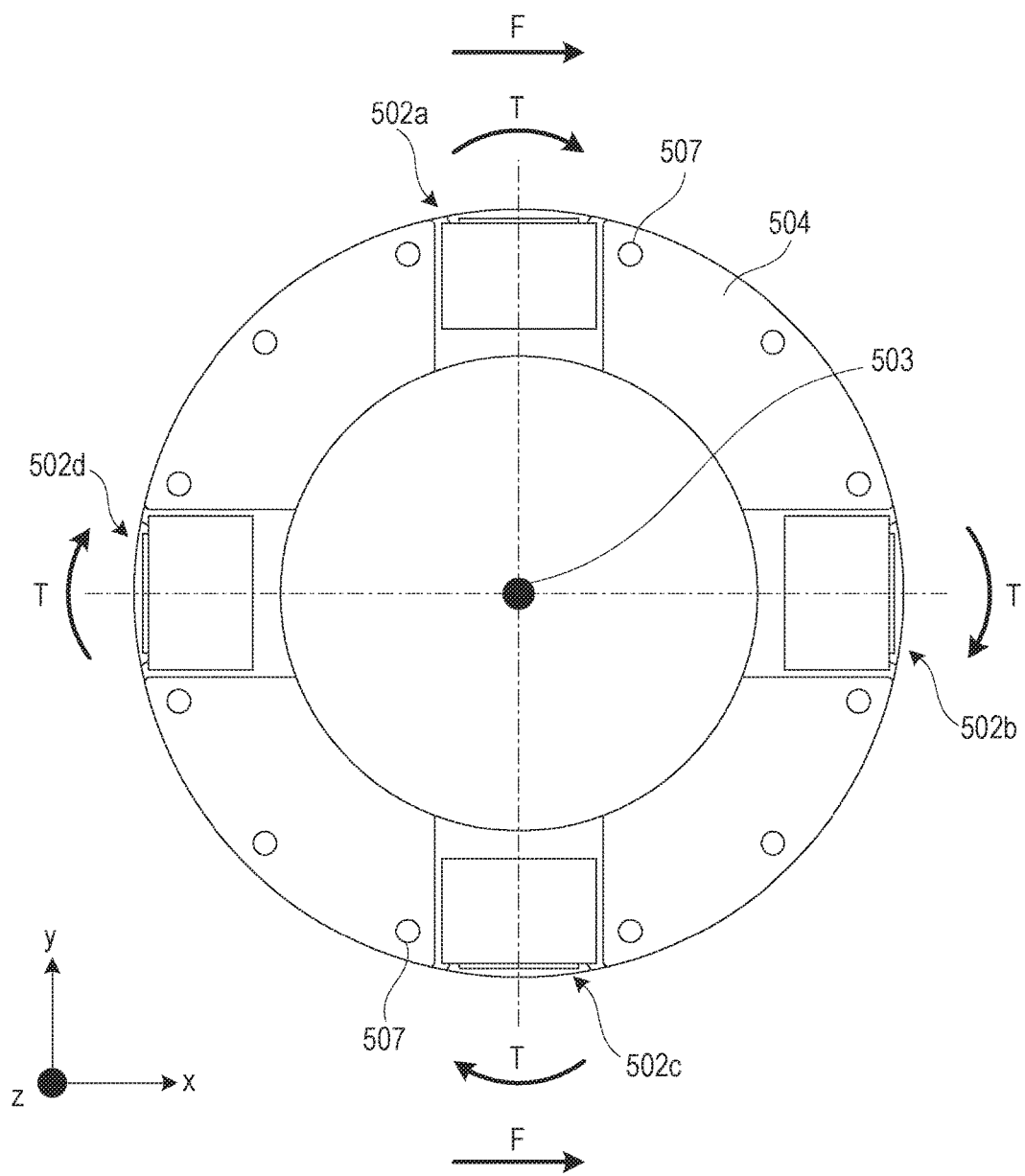
FIG. 9 is a diagram illustrating a different layout of torque sensors and cross-axis force in the robot apparatus in FIG. 1.

The torque sensor 608 (221 to 226) disposed for each of the six joints J1 to J6 is provided with at least two optical encoders (502a and 502b in FIGS. 3 to 8) or four optical encoders (502a to 502d in FIG. 9). Detected torque values A and B (or A, B, C, and D) from the two optical encoders 502a and 502b (or four optical encoders 502a to 502d) of the torque sensor 608 (221 to 226) for the joints J1 to J6 are combined by predetermined calculating process. The result of calculation is fed back to the other input end (in this example, a subtracting end) of the feedback control unit 612. In the example of FIG. 12, an averaging process (610) is executed on a plurality of detected torque values 611 (four values A, B, C, and D in the shown example, see a control example described below), and the averaged value is fed back to the feedback control unit 612.

Figure 13:
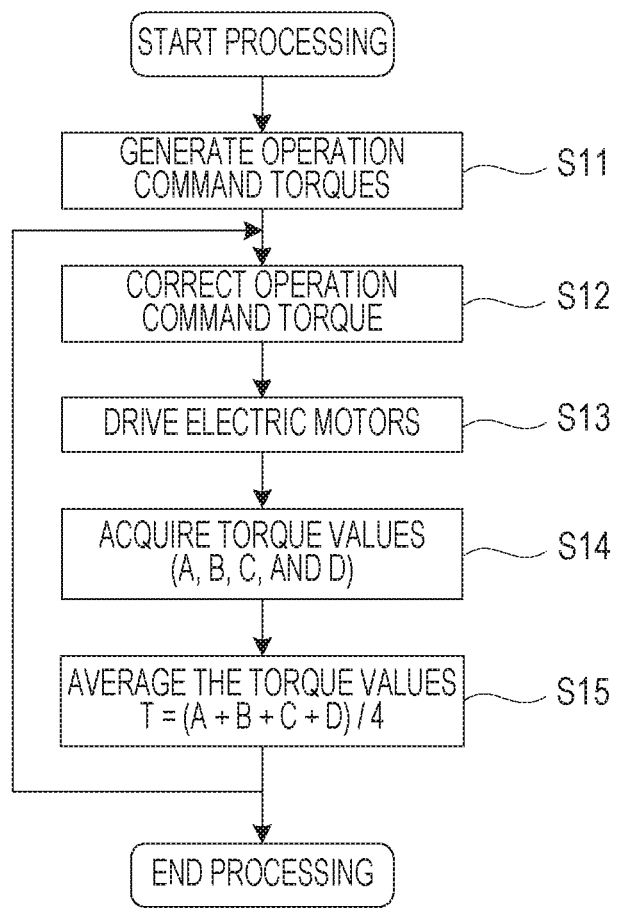
FIG. 13 is a flowchart of the robot control procedure of the robot control unit.

FIG. 13 is a flowchart of the control procedure of the robot control unit 300 (the CPU 601) illustrated in the functional block in FIG. 12. At step S11 in FIG. 13, the command torque (609) is generated according to the robot control program describing teaching points designated according to an operation command from the teaching pendant 400 and the details of work to be performed by the robot arm 200.

Step S12 corresponds to a command torque correcting process performed by the feedback control unit 612 in FIG. 12. At step S12, torque control values to be transmitted to the electric motor 607 (211 to 216) for the joints J1 to J6 are corrected using a correction value acquired at an averaging process (S15). At step S13, the corrected torque control values are transmitted to the electric motor 607 (211 to 216) for the joints J1 to J6, and the servo control unit 230 generates driving current commands to the electric motor 607, for example.

Step S14 corresponds to a detecting process for acquiring a plurality of torque detection values. At step S14, values of torque generated at the six joints J1 to J6 are acquired using the torque sensor 608 (221 to 226) disposed for the six joints J1 to J6, respectively.

At step S15, predetermined calculation is performed on two (or four) torque values acquired from the optical encoders 502a and 502b (or 502a to 502d of the torque sensor 608 (221 to 226). This process corresponds to a calculating process for combining the plurality of torque values acquired as above. Thus, values for the joints J1 to J6 to be fed back to step S12 are calculated by the calculating process.

An example of the calculating process performed at step S15 is averaging. In FIG. 13, detected torque values are averaged ($T=(A+B+C+D)/4$) in an example in which four optical encoders 502a to 502d are provided for each torque sensor 608, as in FIG. 9 (described below). Thus, four detected torque values (A, B, C, D), for example, acquired from the optical encoders 502a to 502d are averaged.

The result of calculation is fed back to a driving control value for controlling the electric motor 607 (211 to 216) for the torque sensor 608 at step S12. This process corresponds to a driving control process for controlling conditions for driving the electric motor 607 (211 to 216) serving as driving sources for the joints J1 to J6 on the basis of the result of calculation in which the plurality of detected torque values are combined.

In the configuration in which two optical encoders are provided for one torque sensor 608 (FIG. 8 described below), two torque values (A and B) detected from the two optical encoders are averaged ($T=(A+B)/2$), and the result of averaging is fed back to step S12.

Structure of Torque Sensor

Figure 3:
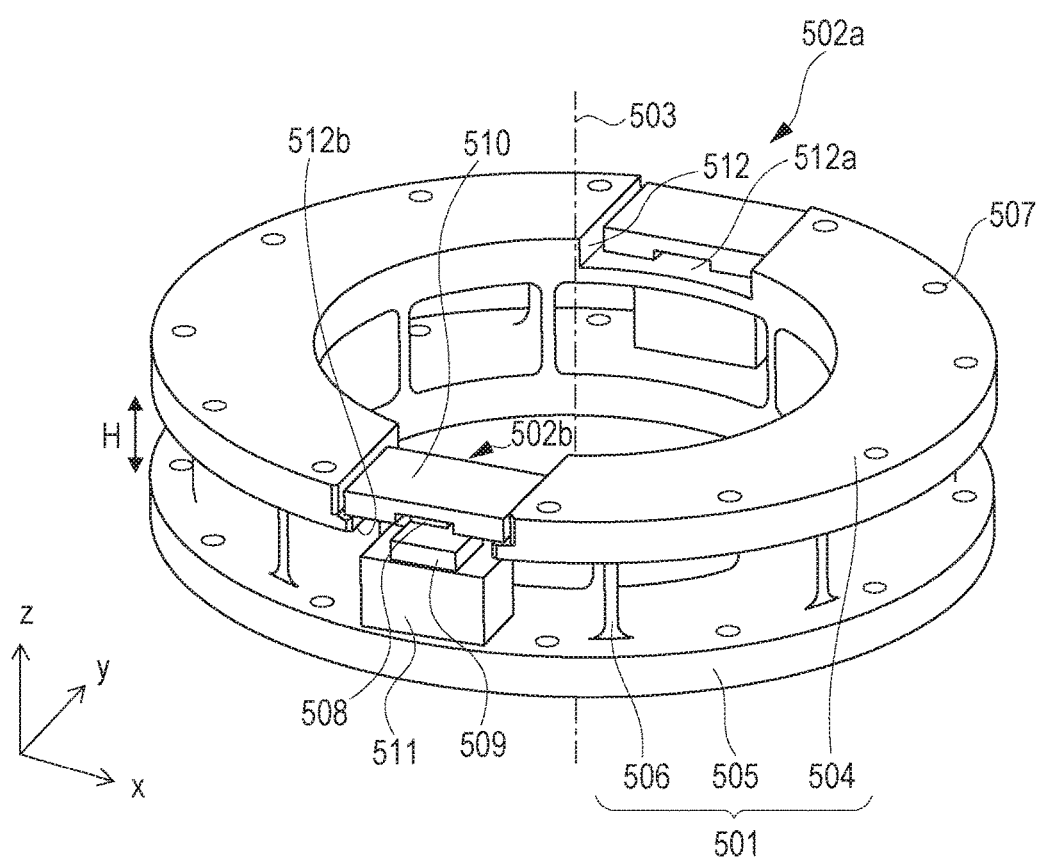
FIG. 3 is a perspective view of a torque sensor of the robot apparatus in FIG. 1 illustrating the configuration thereof.

As shown in FIG. 3, the torque sensors 221 to 226 each include an elastic member 501 and optical encoders 502a and 502b. The optical encoders 502a and 502b are disposed at opposing positions on the same diameter of a concentric circle about a rotation axis 503 around which torque acts on the elastic member 501.

Figure 4:
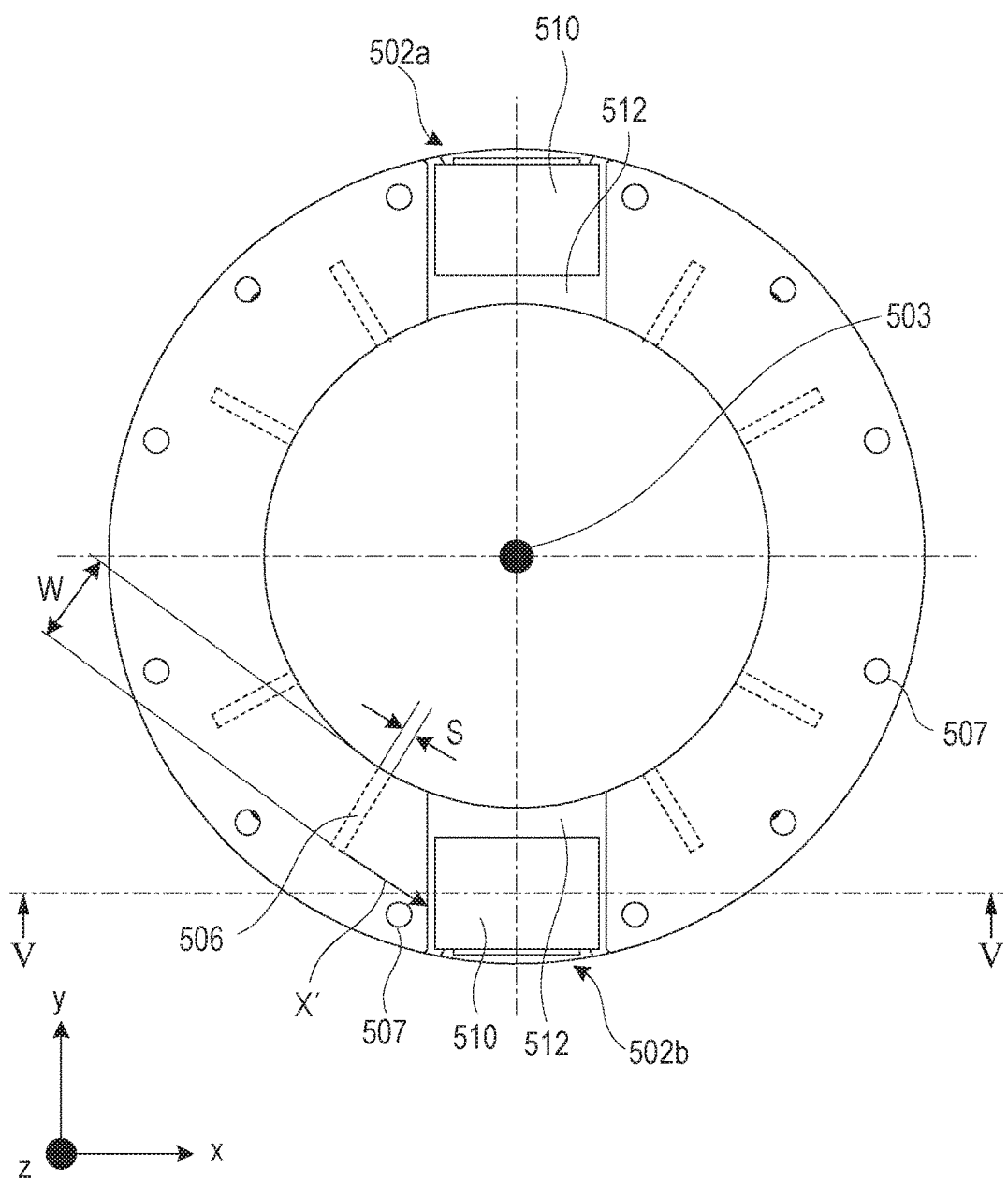
FIG. 4 is a top view of the torque sensor in FIG. 3 illustrating the configuration thereof.

The elastic member 501 includes a first fastening portion 504, a second fastening portion 505, and a plurality of spring portions 506 which are radially disposed to connect the first fastening portion 504 and the second fastening portion 505. In the examples of FIGS. 3 and 4, the first fastening portion 504 has scale fixing portions 512.

Each of the components of the elastic member 501 is made of a material with a modulus of elasticity (spring) according to a target torque detection range, necessary resolution, and so on, for example, resin or metal (steel or stainless steel). The elastic member 501 may be produced with a 3D printer. Specifically, the elastic member 501 may be produced by creating slice data for a 3D printer from design data for the elastic member 501 (for example, CAD data) and inputting the data to a known 3D printer.

The first fastening portion 504 and the second fastening portion 505 are formed in a circular or doughnut (ring) shape, as illustrated. The fastening portions 504 and 505 serve as flanges for fastening the torque sensor (221 to 226) to a relatively displacing object to be measured, for example, the electric motor (211 to 216) and the moving (driven) side frame 242, shown in FIG. 2.

The spring portions 506 are rib-shaped members connecting the circular or ring-shaped first fastening portion 504 and second fastening portion 505 together. The plurality of spring portions 506 are disposed in a radial pattern about the rotation axis 503 around which torque acts.

For example, the spring portions 506 are disposed at a plurality of (eight, in this example) in a radial pattern with respect to the rotation axis 503. The first fastening portion 504 and the second fastening portion 505 each have a plurality of (twelve, in this example) fastening portions (for example, screw holes or tap holes) for fastening to the electric motor (211 to 216) and the frame 242. The positional relationship between fastening portions 507 and spring portions 506 near (closest to) the optical encoder 502a (502b) will be described later.

Figure 5:
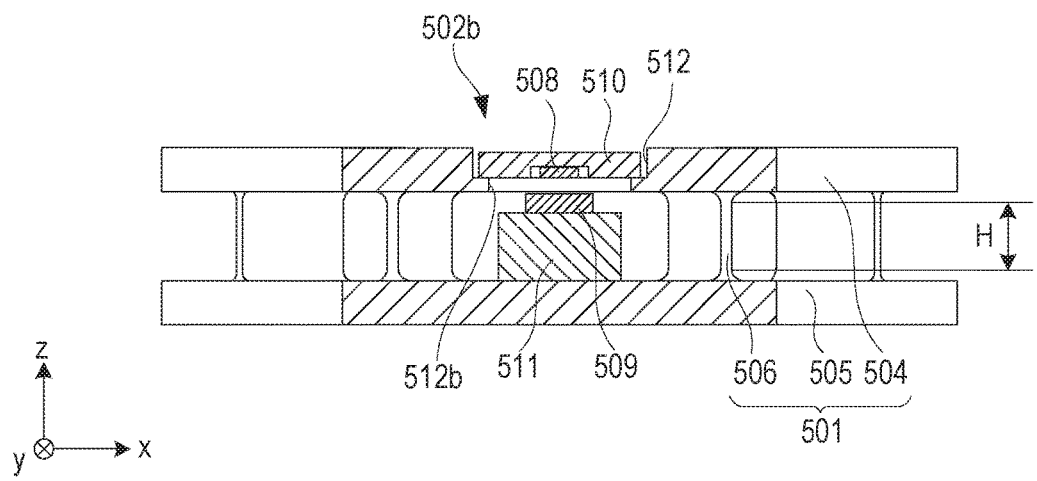
FIG. 5 is a cross-sectional view of the torque sensor in FIG. 4, taken along line V-V.

The optical encoder 502a (502b) has a function of an optical position sensor (encoder). As shown in FIG. 5, the optical encoder 502a (502b) includes a scale 508 (a scale unit) and a detection head 509 that detects positional information from the scale 508. The detection head 509 serves as an optical detection unit that detects the relative rotational displacement of the first fastening portion 504 and the second fastening portion 505.

The scale 508 (the scale unit) and the detection head 509 are respectively mounted to the first fastening portion 504 and the second fastening portion 505 with a scale mount portion 510 and a detection-head mount portion 511. FIG. 5 is a cross-sectional view of the optical encoder 502b in FIG. 4, taken along line V-V.

The scale 508 (the scale unit) is fixed to the elastic member 501 with the scale mount portion 510, and the detection head 509 is fixed to the elastic member 501 with the detection-head mount portion 511.

In this embodiment, the scale mount portion 510 is fixed to the elastic member 501 with the scale fixing portion. As shown in FIG. 3, the whole of each scale fixing portion 512 has a recess 512a in the first fastening portion 504. The recess 512a has a cutout portion 512b (an opening) on the outer periphery side, for opposing the detection head 509 and the scale 508 each other.

The detection-head mount portion 511 is fixed to the elastic member 501 with the second fastening portion 505. The detection head 509 includes a light-emitting element (not shown) and a reflective optical sensor including a light-receiving element. A surface of the scale 508 facing the detection head 509 has a scale pattern (not shown in detail). Examples of the scale pattern include a regular light and shade pattern and a regular reflectance pattern.

Not only one scale pattern but also a plurality of scale patterns (for example, light and shade patterns in different disposition phases) may be disposed depending on the method of detection calculation. The pitch of the scale pattern is determined according to resolution, which is necessary for position detection. The increasing accuracy and resolution of recent encoders allows pitches on the order of μm to be employed.

The detection head 509 emits light from the light-emitting element to the scale 508 and receives light reflected from the scale 508 with the light-receiving element. When the elastic member 501 is deformed in an x-axis direction because of torque around the rotation axis 503, the relative positions of the detection head 509 and the scale 508 change to move the light irradiated position on the scale 508.

When the light applied to the scale 508 passes through the pattern on the scale 508, the amount of light detected by the light-receiving element of the detection head 509 changes. The amount of relative movement of the scale 508 and the detection head 509 is detected from the change in light amount. The amount of movement detected by the detection head 509 is converted to torque acting on the elastic member 501 by torque-detection control (not shown) configured by a control routine that the CPU 601 executes. The torque detection control may be performed by a torque-detection control unit (hardware). The value (the amount of movement) output from the detection head 509 is converted to s detected torque value (for example, A to D in FIGS. 12 and 13) using a sensitivity coefficient for converting the amount of movement detected by the detection head 509 to torque acting on the elastic member 501 with the above torque-detection control unit.

Thus, the torque sensors 221 to 226 can detect torque around the rotation axis 503 (axes A1 to A6 in FIG. 1) acting on the joints J1 to J6, respectively.

In this embodiment, the two optical encoders 502a and 502b are disposed at opposite positions on the same diameter with reference to the rotation axis 503 around which the torque acts on the elastic member 501, as shown in FIGS. 3 and 4. In this case, the detected torque values (A and B) output from the detection heads 509 of the two optical encoders 502a and 502b are averaged (610 in FIG. 12 and S15 in FIG. 13), as described above. This reduces the influence of cross-axis force acting in directions other than the rotation axis 503 relating to target torque detection. Furthermore, this embodiment is configured to acquire detected values relating relative displacement from the optical encoders 502a and 502b disposed on a line on the same diameter centered on the rotation axis 503 or disposed at positions symmetrical about a point. This allows high-accuracy, reliable relative displacement information, and thus a torque value based on the information to be detected by averaging the outputs from the optical encoders 502a and 502b.

The torque sensors 221 to 226 need to have detected torque resolution according to an action to be performed by the robot arm 200. For delicate workpieces made of a soft, lightweight, or low-strength member, as described above, it is necessary to accurately control force acting on the workpieces via joints or links. For such workpieces, the torque sensors 221 to 226 need to have high resolution (high-accuracy torque detection).

Let a torque detecting resolution necessary for the torque sensors 221 to 226 be t. Let a resolution for the amount of relative movement of the scale 508 and the detection head 509 detected by the optical encoder 502 (502a or 502b) be d.

Let the amount of relative displacement between the scale 508 and the detection head 509 caused by deformation of the elastic member 501 due to torque with the necessary resolution t be x. The relation between the resolution d for the amount of relative movement of the scale 508 and the detection head 509 and the relative displacement x detected by the optical encoder 502 (502a, 502b) is expressed as follows:

$$d \leq x \tag{1}$$

The spring portions 506 are the major portions of deformation of the elastic member 501 acted upon by torque, and therefore the size of the spring portions 506 has significant influence on the performance of the torque sensors 221 to 226. Let a dimension (thickness) of the spring portions 506 in a direction tangential to the outer circumference of the elastic member 501 be S, a dimension (length) of the elastic member 501 along the radius be W (see FIG. 4), and a dimension of the elastic member 501 in a direction parallel to the torque acting axis (rotation axis) 503 be H (see FIG. 3).

In this embodiment, the thickness S and the height H of the spring portions 506 are set so that the amount of deformation of the elastic member 501 acted upon by torque satisfies Exp. (1). The relation between the thickness S and the length W is preferably set as follows:

$$W \geq 2S \tag{2}$$

In other words, the dimension of the spring portions 506 in the direction perpendicular to the radial direction and in the direction perpendicular to the rotation axis 503 (the thickness S) is set smaller than the dimension in the radial direction (the length W). Employing such dimension setting provides the spring portions 506 with anisotropic rigidity, for example, low rigidity, which is likely to cause deformation, in the target torque detecting direction, and high rigidity, which is resistant to deformation, in the other directions.

The height H of the spring portions 506 is set smaller than the length W in the radial direction and within the range of the necessary resolution expressed by Exp. (1). This ensures high rigidity, which is resistant to deformation, in directions other than the target torque detecting direction, without the need for guides, and (low) rigidity that satisfies resolution necessary for detecting torque in the torque detecting direction.

This allows the whole of the elastic member 501 to be greatly deformed with small torque in the direction of relative rotational deformation of the first and second fastening portion (504, 505) (in the thickness direction) to be detected. This allows high-accuracy, high-definition deformation detection using the optical encoder 502, thereby enhancing resolution necessary for toque detection and increasing the accuracy.

Furthermore, the entire elastic member 501 exhibits high rigidity, which is resistant to deformation, for translational force and rotational force (torque) in the other directions, or cross-axis force. This reduces torque detection errors of the optical encoder 502 caused by the deformation of the elastic member 501 in the cross-axis direction. This eliminates the need for a guide member for reducing deformation of the elastic member 501, for example, in the cross-axis direction, which has been needed in the related art.

Let torsional rigidity around the rotation axis 503 around which torque acts be $EM_z$, torsional rigidity around the other axes be $EM_x$ and $EM_y$, and rigidity in the translational direction with respect to the coordinate axes x, y, and z in FIGS. 3 to 5 be $EF_x$, $EF_y$, and $EF_z$, where subscripts x, y, and z of the signs indicating the rigidity correspond to the coordinates in FIGS. 3 to 5.

Providing the spring portions 506 with anisotropic rigidity, as expressed by Exp. (2), enhances the rigidity $EF_x$ and $EF_y$ in the translational direction relative to the torsional rigidity $EM_z$ around the rotation axis 503 around which torque acts.

Furthermore, the spring portions 506 connect the first fastening portion 504 and the second fastening portion 505 together in the rotation axis 503 around which torque acts. This allows cross-axis forces $F_z$, $M_x$ and $M_y$ to be supported in the buckling direction of the spring portions 506. This ensures sufficient rigidity of the torque sensor (221 to 226) and therefore the joint (J1 to J6) without using a guide member, such as a bearing, necessary in known configuration.

Thus, the anisotropic rigidity of the spring portions 506 owing to the positional relationship and disposition of the spring portions 506 enhances the rigidity in the other directions relative to the torsional rigidity $EM_z$ around the rotation axis 503 around which torque acts.

In contrast, if resolution necessary for the optical encoder 502 to achieve high rigidity and high resolution of the torque sensor (221 to 226) is on the order of µm or less, an error in detecting the amount of relative displacement between the scale 508 and the detection head 509 due to deformation of the elastic member 501 increases.

Since the error in the amount of displacement detected by the optical encoder 502 (502a, 502b) directly leads to a torque detection error, the configuration of the torque sensor (221 to 226) needs the consideration below. The detailed configurations of the components of the torque sensor (221 to 226) which can be employed to reduce torque detection errors will be described in the following sections: Integral Configuration of Elastic Member 501; Disposition of Fastening Portions 507; and Disposition of Scale and Detection Head of Optical Encoder.

Integral Configuration of Elastic Member 501

The elastic member 501 may have an integral configuration of the first fastening portion 504, the second fastening portion 505, and the spring portions 506. Examples of a method for integrating the first fastening portion 504, the second fastening portion 505, and the spring portions 506 of the elastic member 501 include injection molding and machining of resin or metal.

Another example is a structure in which the first fastening portion 504, the second fastening portion 505, and the spring portions 506 are separate from one another, and they are joined by screwing, bonding, or welding. However, such a separate structure can cause a torque detection error due to sliding of the joints between the components. In contrast, the integral configuration of the first fastening portion 504, the second fastening portion 505, and the spring portions 506 of the elastic member 501 reduces or eliminates occurrence of torque detection errors due to sliding of the joints, allowing higher-accuracy torque detection.

Disposition of Fastening Portions 507

Figure 6:
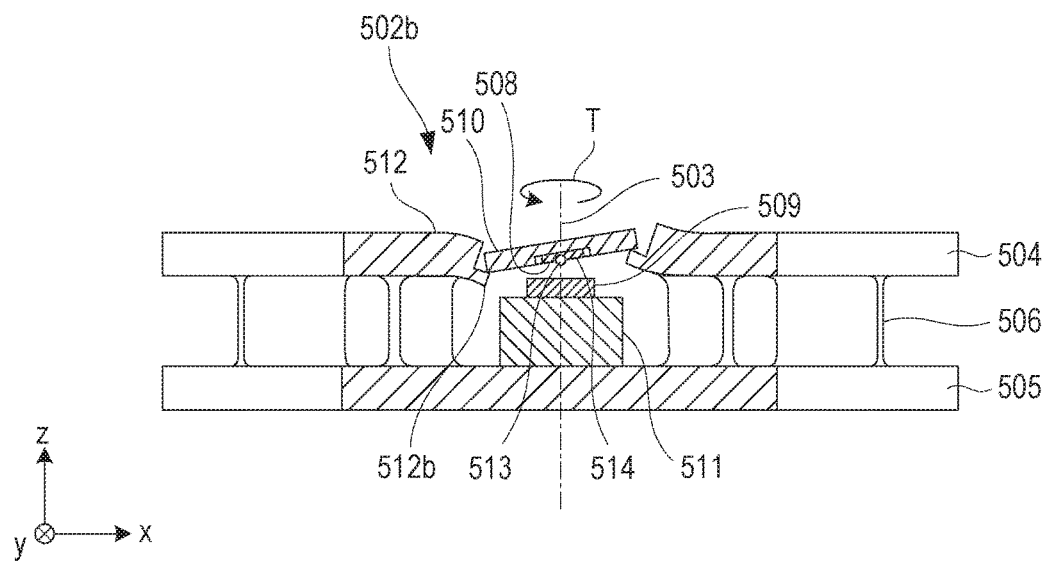
FIG. 6 is a diagram illustrating the state of deformation caused in a scale fixing portion when the torque sensor of a first embodiment is acted upon by torque in the cross-sectional view in FIG. 5.

Referring to FIG. 6, when torque T acts on the elastic member 501, the elastic member 501 is deformed, and the scale fixing portion 512 is also deformed according to the deformation of the elastic member 501. The deformation in the scale fixing portion 512 leads to movement of the scale 508 fixed with the scale fixing portion 512, which causes a torque detection error.

In this embodiment, the first fastening portion 504 and the second fastening portion 505 of the elastic member 501 each have the link fastening portions 507. In this embodiment, fastening portions 507 adjacent to each optical encoder 502 are disposed between one of the spring portions 506 and one of the scale fixing portions 512, as shown in FIG. 4, in consideration of the deformation of the scale fixing portions 512, as described above. Such disposition of the fastening portions 507 reduces deformation of the scale fixing portions 512 when the torque T acts on the elastic member 501, thereby reducing occurrence of torque detection errors.

For example, let the length of a vector X' extending from the spring portion 506 to the scale fixing portion 512 in FIG. 4 be L. The deformation of the scale fixing portion 512 in the z-axis direction corresponds to the deflection of a cantilever of the length L starting from the spring portion 506 unless the fastening portion 507 is disposed between the spring portion 506 and the scale fixing portion 512.

In contrast, disposing the fastening portion 507 between the spring portion 506 and the scale fixing portion 512 allows the deformation to be started from the fastening portion 507. This makes the distance from the starting point of deformation to the scale fixing portion 512 shorter than the length L, thereby reducing the deformation of the scale fixing portion 512 in the z-axis direction.

In this embodiment, the fastening portion 507 is disposed so that the distance from the fastening portion 507 to the scale fixing portion 512 is about one third of the length L of the vector X'. This reduces the amount of deformation of the scale fixing portion 512 in the z-axis direction to about one twenty-seventh of the amount of deformation when the fastening portion 507 is not disposed between the spring portion 506 and the scale fixing portion 512.

Disposition of Scale and Detection Head of Optical Encoder

The entire scale fixing portion 512 has the recess 512a provided in the first fastening portion 504, as described above. The recess 512a has the cutout portion 512b (opening), at the outer circumference side, for opposing the detection head 509 and the scale 508 each other. Because of this, the scale fixing portion 512 is smaller in thickness in the Z-direction than the other part of the first fastening portion 504 and therefore can be irregularly deformed when the torque T acts on the entire elastic member 501, as shown in FIGS. 6 and 7.

Figure 7:
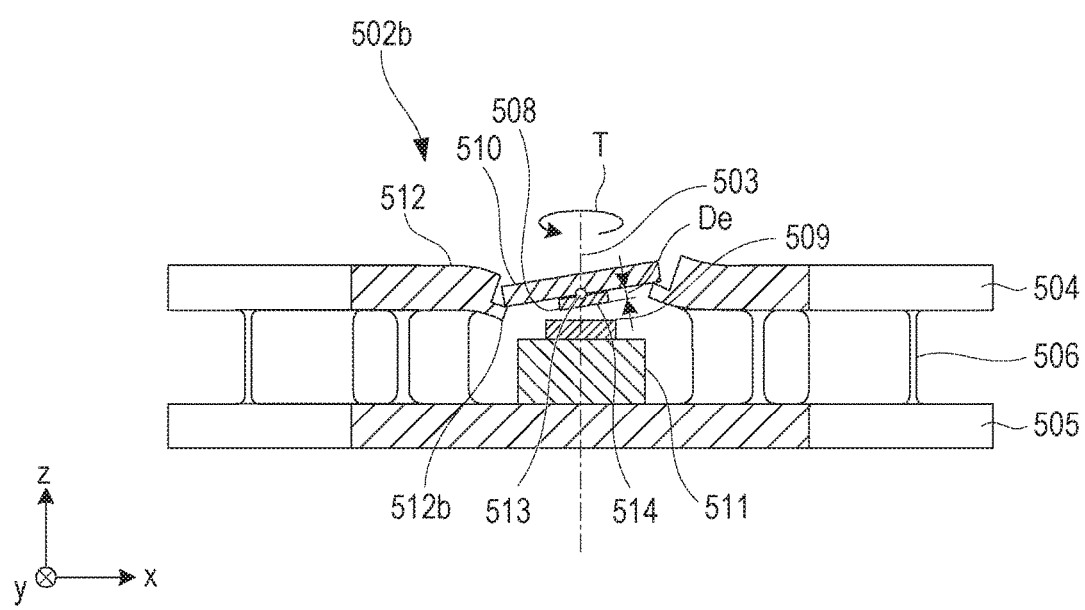
FIG. 7 is a diagram illustrating a state in which the rotation center of the scale due to deformation of the scale fixing portion and the scale surface has a gap.

As shown in FIGS. 6 and 7, when the torque T acts on the elastic member 501, the scale fixing portion 512 can be irregularly deformed around the y-axis in the drawing, for example, one edge of the cutout portion 512b (opening) of the scale fixing portion 512 is turned up, and the other edge turns down. The deformation of the scale fixing portion 512 causes the scale 508 to rotate around the y-axis, as shown. The rotation of the scale 508 around the y-axis causes the entire patterned surface 514 (the scale surface) to sway to move in the x-axis direction. This also applies to a configuration in which the positional relationship between the detection head 509 and the scale 508 is opposite, for example, the scale 508 is disposed in the second fastening portion 505.

In this embodiment, the position of the scale surface of the scale 508 positioned via the scale mount portion 510 is determined as shown in FIG. 6. In other words, this embodiment has a configuration in which the structure of the scale fixing portion 512 allows the scale 508 to be rotationally displaced with respect to the disposed surface by the relative displacement of the elastic member 501.

In this case, the scale 508 is supported at a position so that the rotation center of the rotational displacement of the scale 508 is positioned on the scale surface (the patterned surface 514) of the scale 508. The supporting position (height) of the scale 508 is, for example, a height at which the scale 508 is mounted at the first fastening portion 504 (or the second fastening portion 505), which is determined by a height at which the scale fixing portion 512 supports the scale mount portion 510.

The supporting height of the scale 508 is determined as follows. As shown in FIG. 6, the scale mount portion 510 is disposed at the scale fixing portion 512 so that the rotation center 513 of the scale 508 about the y-axis due to (irregular) deformation of the scale fixing portion 512 acted upon by the torque T is on the patterned surface 514 (the scale surface).

In particular, to achieve the supporting height of the scale 508, as described above, the scale 508 is mounted on the lower surface of the scale mount portion 510 so that the scale mount portion 510 is flush with the patterned surface 514 (the scale surface). The flush disposition can easily be achieved by disposing the scale 508 in a recess provided in the lower surface of the scale mount portion 510.

The above configuration reduces the amount of movement of the patterned surface 514 of the scale 508 in the x-axis direction (the torque detecting direction) in the drawing even when the scale 508 rotates about the y-axis, reducing occurrence of torque detection errors. To show that, FIG. 7 illustrates a configuration in which the patterned surface 514 of the scale 508 and the rotation center 513 of the scale 508 have a gap of De.

With the configuration in FIG. 7, when the scale 508 rotates about the y-axis by θy because of deformation of the scale fixing portion 512, the entire scale 508 sways to amplify the amount of movement in the x-axis direction by (tan θy)*De. This results in that position detection errors larger than that with the configuration in FIG. 6 and therefore torque detection errors are generated from the optical encoder in FIG. 7. In contrast, the torque sensor (221 to 226) of this embodiment has a configuration in which the rotation center 513 of the scale 508 and the patterned surface 514 of the scale 508 are aligned, as shown in FIG. 6 so that De=0 holds. This prevents the patterned surface 514 of the scale 508 from moving along the x-axis (in the torque detecting direction) because of (irregular) deformation of the scale fixing portion 512, reducing torque detection errors.

Method for Correcting Torque Detection Errors

As shown in FIG. 3, the two optical encoders 502a and 502b are mounted to the elastic member 501 in opposite directions with respect to the rotation axis 503 around which torque acts. This configuration is used to correct a torque detection error that occurs when a cross-axis force is exerted on the elastic member 501, that is, a torque detection error arising from cross-axis interference.

For example, the average value of torque values detected by the individual detection heads 509 (optical detection units) of the optical encoders 502a and 502b is output as detected torque information corresponding to the amount of deformation of the elastic member 501, as follows.

Let detected torque values calculated from detection signals from the optical encoders 502a and 502b when torque T and cross-axis force F act on the elastic member 501 at the same time, as shown in FIG. 8, be A and B, and torque detection errors due to cross-axis interference be $\delta T_A$ and $\delta T_B$, respectively. Since the signs of $\delta T_A$ and $\delta T_B$ differ between plus and minus, the detected torque values A and B are averaged using Exp. (3), as follows:

$$(A+B)/2=\{(T+\delta T_A)+(T-\delta T_B)\}/2=T+(\delta T_A-\delta T_B)/2=T+\delta T_r \quad (3)$$

The difference between the absolute values of $\delta T_A$ and $\delta T_B$ changes according the symmetry disposition of the spring portions 506 with respect to the rotation axis 503 around which torque acts, errors in mounting the components 508 to 511 constituting the optical encoders 502a and 502b, and other factors, although the difference is minute. Therefore, $\delta T_r < \delta T_A$, $\delta T_B$ holds, so that the influence of the torque detection errors can be reduced to a remaining component $\delta T_r$ of the detection errors, as expressed in Exp. (3).

The use of the torque sensor including the high-resolution optical encoder as in this embodiment allows minute displacement of the elastic member to be detected, achieving both of high resolution and high rigidity. For that reason, the torque sensor according to the first embodiment allows even an articulated robot without guides for holding the force of the joints to have high rigidity of the joints, thereby preventing a decrease in robot controllability due to a decrease in rigidity.

Furthermore, the torque sensor of this embodiment is capable of high-accuracy torque detection because torque detection errors can be reduced. Using the high-accuracy detected torque for controlling driving of an articulated robot allows automated production of products in an assembly process in which a load on the components has to be on the order of a few grams, such as a soft or low-strength object assembly process.

Furthermore, the torque sensor of this embodiment has a configuration in which the spring portions of the elastic member of the torque sensor are smaller in dimension in a direction tangential to a circle centered on the rotation axis than in dimension in the radial direction, and in which the distance between the first fastening portion and the second fastening portion is smaller than the dimension in the radial direction. This provides the spring portions with anisotropic rigidity, for example, low rigidity, in the torque detecting direction, and high rigidity in the cross-axis direction. This allows both of high rigidity in the cross-axis direction and high-accuracy torque detection to be achieved. For example, disposing the torque sensors at the joints of a robot apparatus allows the articulating mechanism to have sufficient rigidity, and also for minute torque detection, reduces the influence of cross-axis force, thereby allowing high-accuracy torque detection.

Furthermore, the optical encoders according to this embodiment are disposed on a concentric circle centered on the rotation axis of the rotational displacement of the elastic member of the torque sensor. This allows high-resolution and high-accuracy torque detection. For robot control, the driving source for each robot joint can be controlled on the basis of the result of calculation on the output from the optical detection units of the plurality of optical encoders. This allows the driving source for the joint to be controlled according to torque acting on the elastic member according to the relative displacement of the links connected with the joint. An example of calculation on the outputs from the optical detection units is averaging of torque values detected by the optical detection units. The plurality of optical encoders may be opposed on diameters passing through the rotation axis of the rotational displacement of the elastic member of the torque sensor, for example. This configuration reduces influences of disturbance, such as a cross-axis force component, by averaging the outputs from the plurality of optical encoders, allowing high-accuracy torque detection.

Second Embodiment

Method for Correcting Torque Detection Error

In the first embodiment, the two optical encoders 502a and 502b are mounted on the elastic member 501 in opposite directions with respect to the rotation axis 503 around which torque acts to reduce torque detection errors due to cross-axis interference.

A torque sensor according to a second embodiment includes four optical encoders 502a to 502d in total, as shown in FIG. 9. The optical encoders 502a to 502d are disposed at regular intervals of 90° on a circumference centered on the rotation axis 503 around which torque acts. Among them, the optical encoders 502a and 502c and the optical encoders 502b and 502d are opposed to each other on diameters of a concentric circle centered on the rotation axis 503.

This configuration allows torque detection errors due to cross-axis interference to be corrected more accurately than the configuration of the first embodiment. A method for correcting torque detection errors according to the second embodiment will be described.

FIG. 9 shows a state in which the elastic member 501 is acted upon by the torque T and the cross-axis force F along the X-axis at the same time. The cross-axis force F acts to move the first fastening portion 504 and the second fastening portion 505 in parallel along the x-axis. For example, for the optical encoders 502a and 502c, when the cross-axis force F acts on the first fastening portion 504 and the second fastening portion 505, the relative positions of the detection head 509 and the scale 508 can move in the x-axis direction. In other words, the output from the optical encoders 502a and 502c can have detection errors due to cross-axis interference.

Let a detected torque value calculated from a detection signal from the optical encoder 502a disposed in the direction of 12 o'clock in FIG. 9 with reference to the rotation axis 503 around which torque acts be A, and a detected torque value calculated from a detection signal from the optical encoder 502b disposed in the direction of 3 o'clock be B. Let a detected torque value calculated from a detection signal from the optical encoder 502c disposed in the direction of 6 o'clock be C, and a detected torque value calculated from a detection signal from the optical encoder 502d disposed in the direction of 9 o'clock be D.

The detected torque values B and D are not influenced by the cross-axis force F because the direction of the action of the cross-axis force F is perpendicular to the y-axis, which is the detecting direction of the optical encoder 502b and 502d. In other words, the detected torque values B and D are averaged using Exp. (4). These components are not affected by cross-axis interference.

$$(B+D)/2=T \quad (4)$$

In contrast, the detected torque values A and C are affected by the cross-axis force F because the direction of the action of the cross-axis force is the same as the X-axis, which is the position detecting direction of the optical encoders 502a and 502c. The average value (A+C)/2 of two detected torque values output from the optical encoders 502a and 502c influenced by the cross-axis force F can be given by (A+C)/2=T+δT$_r$, as with (A+B)/2 of Exp. (3).

In this embodiment, the detected torque values A, B, C, and D output from the four optical encoders 502a to 502d are averaged. The averaging is performed using Exp. (5) from Exp. (3) and Exp. (4).

$$(A+B+C+D)/4 = \{(A+C)/2 + (B+D)/2\}/2 \quad (5)$$
$$= \{(T + \delta T_r) + T\}/2$$
$$= T + 0.5\delta T_r$$

In the example of FIG. 9, the torque detection errors due to cross-axis interference are caused only by the outputs from the optical encoders 502a and 502c. This reduces the influence of the remaining component δTr of the torque detection errors due to cross-axis interference into half that of the first embodiment in which only the optical encoders 502a and 502c in FIG. 9 are disposed (as in the first embodiment).

Although FIG. 9 illustrates a configuration in which four optical encoders are disposed, much more optical encoders may be disposed at the elastic member 501 of the torque sensor (221 to 226). This can further decrease the proportion of optical encoders influenced by cross-axis force in a specific direction among the total optical encoders, further reducing detection errors due to cross-axis interference.

Modifications

The number of the spring portions 506 of the elastic member 501 of each of the torque sensors 221 to 226 is not limited to the number in the above embodiments. In the above embodiments, the distance between two spring portions 506 adjacent to the optical encoder 502 (502a to 502d) is larger than that between the other spring portions 506. The distance between the spring portions 506 is not limited to that in the above embodiments. The numbers of the scales 508 and the detection heads 509 are also not limited to the number in the embodiments. For example, four or more may be disposed.

FIG. 6 illustrates a disposition in which the rotation center 513 of the scale 508 about the y-axis is aligned with the patterned surface 514 of the scale 508 even if the scale fixing portion 512 is irregularly deformed to rotationally displace the scale 508 with respect to the disposed surface. Thus, in FIG. 6, the patterned surface 514 of the scale 508 and the surface of the scale mount portion 510 are flush with each other.

Figure 10:
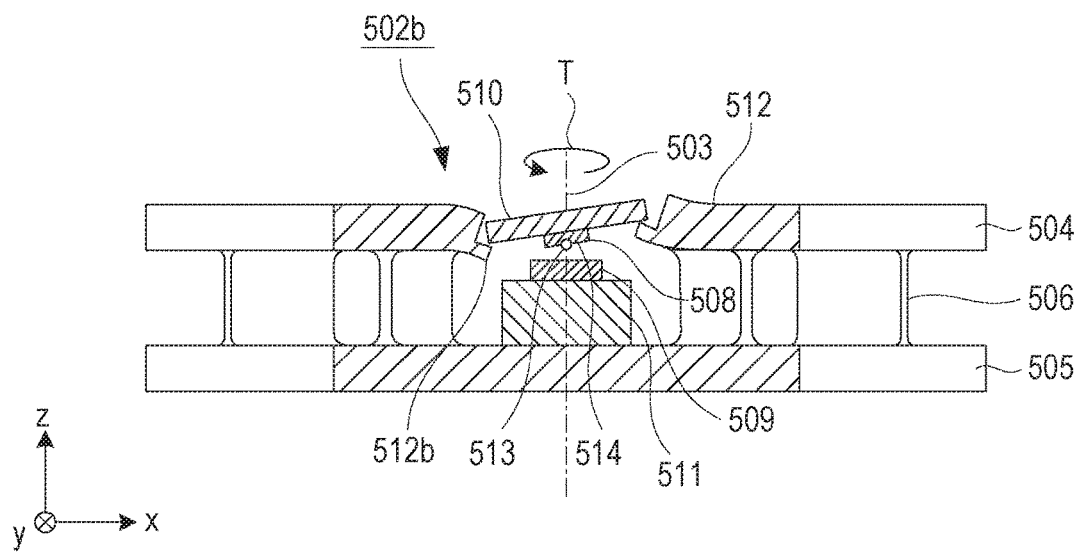
FIG. 10 is a diagram illustrating another configuration in which the rotation center of the scale due to deformation of the scale fixing portion is aligned with the scale surface.

However, by making the rotation center 513 of the scale 508 about the y-axis flush with the patterned surface 514 of the scale 508 using some way, as in FIG. 10, the advantage of reducing torque detection errors as with the above can be expected. For example, a spacer or a shim (not shown) may be disposed between the scale mount portion 510 and the scale fixing portion 512, or the supporting height of the scale mount portion 510 may be adjusted by changing the shape of the edge of the recess 512a of the scale fixing portion 512.

The above embodiments employ a reflective optical encoder that reflects light emitted from the detection head 509 from the patterned surface of the scale 508 and reads the amount of relative movement. In some embodiments, an optical encoder other than the reflective type is employed.

In the above embodiments, the robot arm 200 is a six-axis articulated robot with six joints. However, the number of joints is not limited to six. Although the robot arm 200 has a vertical articulated configuration, different types of articulated robot arm, such as a parallel link type, allows the above configuration.

An example of the configuration of the joints of the robot arm 200 is illustrated in FIG. 2. The configuration of the joints is not limited to that and may be freely changed in design by those skilled in the art. The configuration of the servo motors 201 to 206 is not limited to the above. The driving sources for driving the joints may be devices, such as artificial muscle.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-225421, filed Nov. 18, 2015 and No. 2016-211606, filed Oct. 28, 2016, which are hereby incorporated by reference herein in their entirety.

What is claimed is:
1. A sensor comprising:
a first portion;
a second portion disposed to face the first portion;
a plurality of connection portions disposed between the first portion and the second portion, the plurality of connection portions connecting the first portion and the second portion; and
an encoder configured to detect an amount of relative displacement of the first portion and the second portion, wherein the plurality of connection portions have portions that extend in a direction away from a rotation center at intervals in a rotational direction of one or both of the first portion and the second portion, the encoder includes a scale unit disposed in the first portion, and a detection unit disposed in the second portion and to face the scale unit, the plurality of connection portions include a first connection portion and a second connection portion that is adjacent to the first connection portion, and the scale unit and the detection unit are disposed between the first connection portion and the second connection portion.

2. The sensor according to claim 1, wherein each of the plurality of connection portion has a dimension in the rotation direction smaller than a dimension in the direction away from the rotation center, and a distance between the first portion and the second portion is smaller than the dimension in the direction away from the rotation center.

3. The sensor according to claim 1, wherein the encoder comprises a plurality of the encoders and rotation center is disposed at least between two of the plurality of encoders.

4. The sensor according to claim 3, wherein two of the plurality of encoders are disposed on a diameter of the concentric circle.

5. The sensor according to claim 3, wherein the plurality of encoders are disposed at regular intervals on a circumference of the concentric circle.

6. The sensor according to claim 3, wherein an average value detected by the detection units of the plurality of encoders is output.

7. The sensor according to claim 1, wherein the first portion, the second portion, and the plurality of connection portions comprise an integrally configured elastic member.

8. The sensor according to claim 7, wherein the first portion, the second portion, and the plurality of connection portions are produced with a three-dimensional printer.

9. The sensor according to claim 8, further comprising slice data for a three-dimensional printer for producing the sensor.

10. The sensor according to claim 1, wherein the first portion or the second portion comprises a fastening portion for the first portion or the second fastening portion to one of objects to be measured, the fastening portion being disposed between the scale unit or the detection unit and one of the plurality of connection portions proximate to the scale unit or the detection unit.

11. The sensor according to claim 1, wherein the first portion and the second portion are in a circular or a ring shape.

12. The sensor according to claim 1, wherein the plurality of connection portions are disposed at a position overlapping a position of the first portion and a position of the second portion when viewing the sensor in a planner view in the rotation direction.

13. The sensor according to claim 1, wherein the encoder is an optical encoder.

14. The sensor according to claim 1, wherein at least one of the first portion and the second portion comprises a plurality of members.

15. The sensor according to claim 14, wherein:
the first portion includes two members,
one of the two members has a recess,
another of the two members has the scale unit, and
the another of the two members is disposed in the recess.

16. A robot, comprising
a sensor, the sensor comprising:
a fastening portion; a second portion disposed to face the first portion;
a plurality of connection portions disposed between the first portion and the second portion, the plurality of connection portions connecting the first portion and the second portion; and
an encoder configured to detect an amount of relative displacement of the first portion and the second portion,
wherein the first portion and the second portion are relatively displaceable via the plurality of connection portions,
the plurality of connection portions have portions that extend in a direction away from a rotation center at intervals in a rotation direction of one or both of the first portion and the second portion,
the encoder includes a scale unit disposed in the first portion, and a detection unit disposed in the second portion and to face the scale unit,
the plurality of connection portions include a first connection portion and a second connection portion that is adjacent to the first connection portion, and
the scale unit and the detection unit are disposed between the first connection portion and the second connection portion.

17. A sensor comprising:
a first portion;
a second portion disposed to face the first portion;
a plurality of connection portions configured to connect the first portion and the second portion; and
a plurality of encoders configured to detect an amount of relative displacement of the first portion and the second portion,
wherein the plurality of connection portions have portions that extend in a direction away from a rotation center at intervals in a rotation direction of one or both of the first portion and the second portion,
each of the plurality of encoders includes a scale unit disposed in the first portion, and a detection unit disposed in the second portion and to face the scale unit,
the plurality of encoders include a first encoder and a second encoder, and
a rotation center where one or both of the first portion and the second portion rotate is disposed between the first encoder and the second encoder.

18. The sensor according to claim 17, wherein each of the plurality of connection portions has a dimension in the rotational direction than a dimension in the direction away from the rotation center.

19. The sensor according to claim 17, wherein the plurality of encoders are disposed at regular intervals on a circumference of a concentric circle.

20. The sensor according to claim 17, wherein each of the plurality of encoders is an optical encoder.

21. The sensor according to claim 17, wherein a distance from the first encoder to the rotation center and a distance from the second encoder to the rotation center is the same.

* * * * *